(12) United States Patent
Civolani et al.

(10) Patent No.: US 10,676,286 B2
(45) Date of Patent: Jun. 9, 2020

(54) ASSEMBLY FOR MOVEMENT ACCORDING TO PREDEFINED RULES OF MOTION

(71) Applicant: ILAPAK ITALIA S.P.A., Foiano Della Chiana (IT)

(72) Inventors: Daniele Civolani, Molinella (IT); Francesco Marchioni, Bologna (IT)

(73) Assignee: ILAPAK ITALIA S.P.A., Foiano Della Chiana (IT)

( * ) Notice: Subject to any disclaimer, the term of this patent is extended or adjusted under 35 U.S.C. 154(b) by 0 days.

(21) Appl. No.: 16/321,358

(22) PCT Filed: Jul. 18, 2017

(86) PCT No.: PCT/EP2017/068126
§ 371 (c)(1),
(2) Date: Jan. 28, 2019

(87) PCT Pub. No.: WO2018/019658
PCT Pub. Date: Feb. 1, 2018

(65) Prior Publication Data
US 2019/0161282 A1    May 30, 2019

(30) Foreign Application Priority Data

Jul. 28, 2016 (IT) .................. 102016000079187

(51) Int. Cl.
*B65G 23/30* (2006.01)
*B65G 47/28* (2006.01)

(52) U.S. Cl.
CPC ............. *B65G 23/30* (2013.01); *B65G 47/28* (2013.01)

(58) Field of Classification Search
None
See application file for complete search history.

(56) References Cited

U.S. PATENT DOCUMENTS

| 2,917,170 | A |   | 12/1959 | Flodin |
| 3,845,852 | A | * | 11/1974 | Langen .............. B65B 21/06 198/419.3 |

(Continued)

FOREIGN PATENT DOCUMENTS

| DE | 19510649 A1 | 5/1996 |
| FR | 2236391 A5 | 1/1975 |

(Continued)

OTHER PUBLICATIONS

International Search Report dated Aug. 8, 2017 re: Application No. PCT/EP2017/068126, pp. 1-3, citing: U.S. Pat. No. 2,917,170 A, FR 2 879 179 A1, DE 195 10 649 A1 and FR 2 236 391 A5.

(Continued)

*Primary Examiner* — William R Harp
(74) *Attorney, Agent, or Firm* — Cantor Colburn LLP

(57) ABSTRACT

An assembly for movement according to predefined rules of motion, includes a supporting frame forming a working path that accommodates a driving element with which at least one movable element is associated which is adapted to move an item to be subjected to a process. The assembly includes, interposed between the driving element and each respective movable element, at least one movement adjustment apparatus having a contoured guide, arranged substantially parallel to the driving element, at least one first lever that has a first end that can slide within the guide, and a portion that is pivoted to at least one second lever which in turn is coupled rigidly to the driving elements. The first lever has a second end, which is opposite the one that can slide in the guide, which is articulated to a linkage, which in turn is pivoted on a portion of a respective movable element.

9 Claims, 3 Drawing Sheets

(56) References Cited

U.S. PATENT DOCUMENTS

| | | | | |
|---|---|---|---|---|
| 5,692,594 | A * | 12/1997 | Sidler | B65G 23/30 |
| | | | | 198/457.07 |
| 6,851,543 | B2 * | 2/2005 | Nakanishi | B65G 23/30 |
| | | | | 198/459.4 |
| 2003/0216235 | A1 | 11/2003 | Resterhouse | |

FOREIGN PATENT DOCUMENTS

| | | |
|---|---|---|
| FR | 2879179 A1 | 6/2006 |
| WO | 2016034956 A1 | 3/2016 |

OTHER PUBLICATIONS

Written Opinion dated Aug. 8, 2017 re: Application No. PCT/EP2017/068126, pp. 1-6, citing: U.S. Pat. No. 2,917,170 A.
IT Search Report dated Apr. 20, 2017 re: Application No. IT 2016000791887, pp. 1-8, citing: U.S. Pat. No. 2,917,170 A, FR 2 879 179 A1, DE 195 10 649 A1 and FR 2 236 391 A5.

* cited by examiner

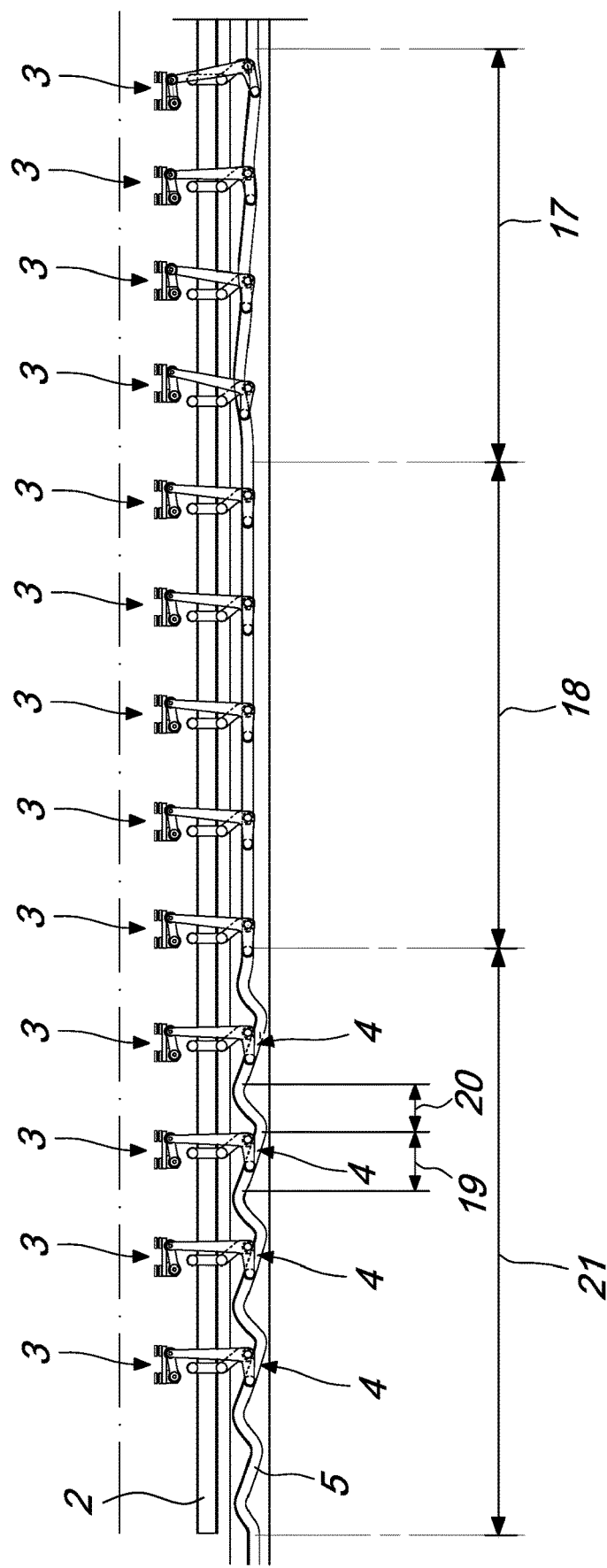

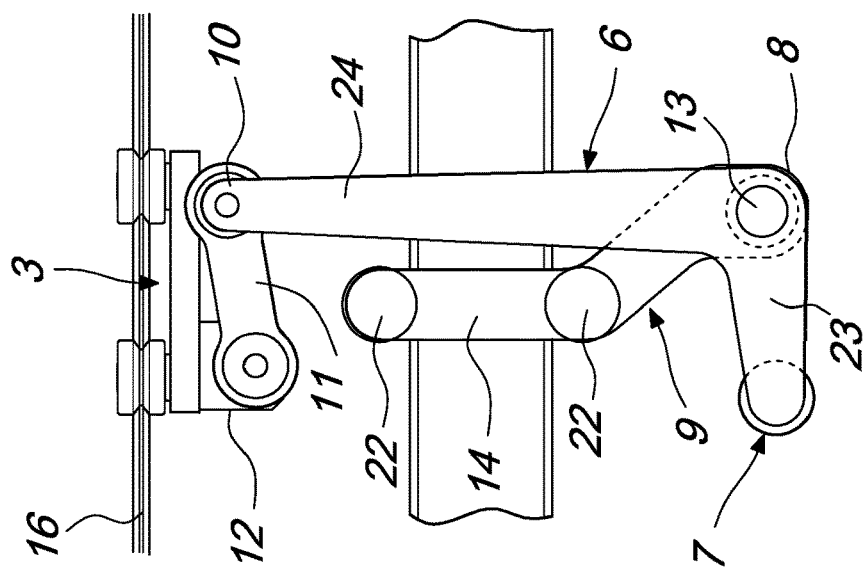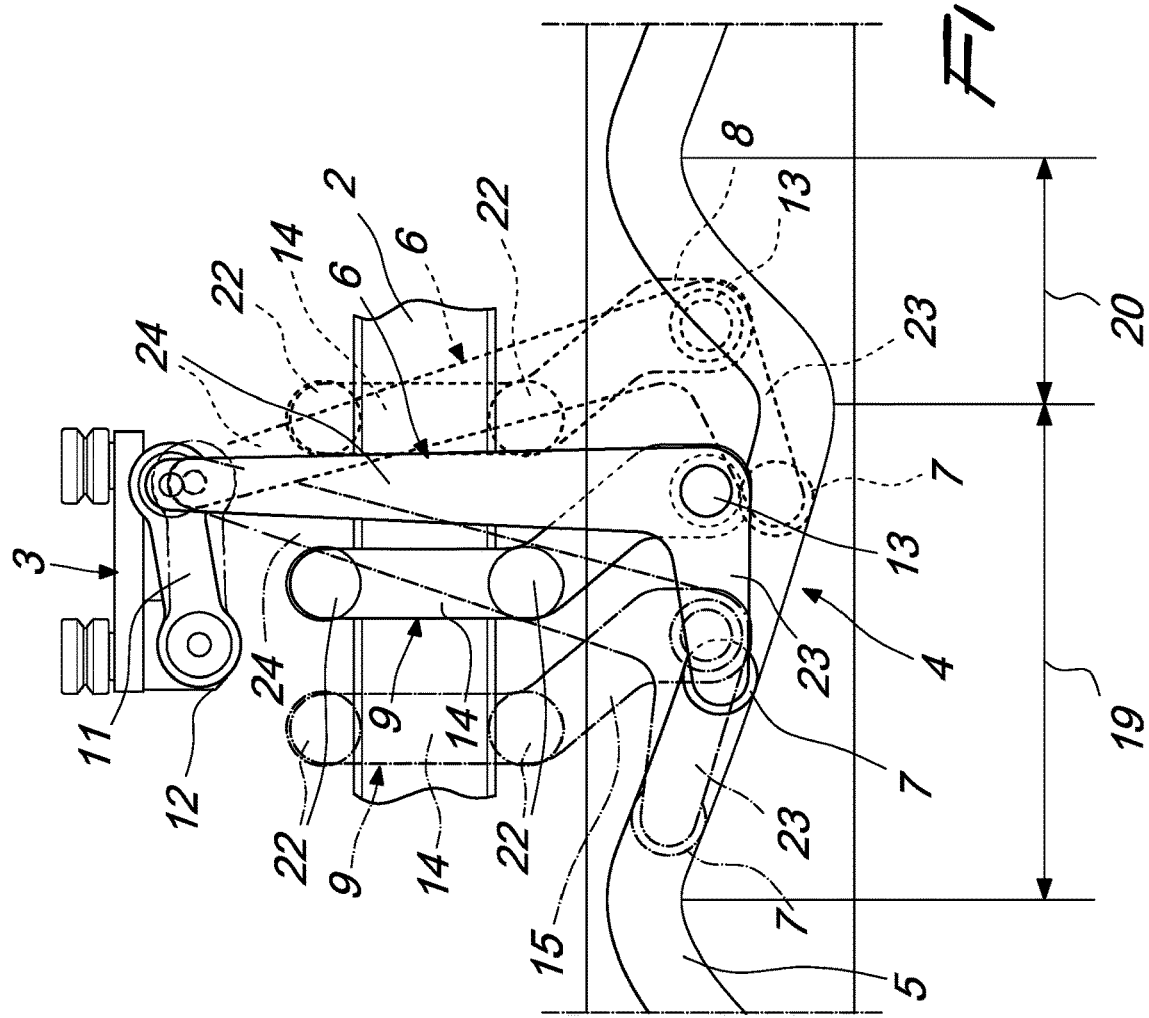

ASSEMBLY FOR MOVEMENT ACCORDING TO PREDEFINED RULES OF MOTION

TECHNICAL FIELD

The present disclosure relates to an assembly for movement according to predefined rules of motion.

BACKGROUND

All machines used for packaging, and also many processing machines, require the products to be packaged (or the intermediate products on which appropriate processes are to be performed) to comply with specific rules of motion which can provide for portions at constant speed, accelerations, decelerations and stops, which are variously spaced as a function of the requirements of the specific step of processing to which they are subjected.

In order to deal with complex rules of motion, specific controlled motor drives are normally used.

Generally, in order to ensure that each one of the elements of a carousel or of a line for packaging/processing can move independently of the contiguous ones but in accordance with the specific rule of motion, it is normal to resort to specific controlled motor drive units, which are controlled by a respective control and management processor.

This solution offers excellent versatility and allows to comply perfectly with the parameters prescribed by the rule of motion of each individual element.

However, the presence of many individually controlled motor drive units entails a considerable increase in production costs (tied to the purchase costs of the individual units) and also the need to have a computer that is capable of managing independently the supply parameters of each individual unit.

These machines are therefore extremely expensive.

Moreover, the increase in costs, in many cases, cannot be justified in relation to the fact that the various rules of motion of each movable element will remain unchanged throughout the operating life of the machine The reconfiguration possibility that is typical of controlled motor drive units, therefore, in many cases is not utilized fully and validly.

This entails that machines of the known type, in order to cope with the need to move each element according to a specific, predefined and complex rule of motion, resort to controlled movement units which are controlled by a respective computer, despite not providing for possible modifications of said rules of motion, with consequent high production costs.

It is also known to resort to machines the movable elements of which are all mounted on respective conveyance elements that trace the steps of a common rule of motion.

Obviously, in this manner it is not possible to operate continuously, and each stop affects all the elements, greatly limiting the speed of machine and minimizing its productivity.

SUMMARY

The aim of the present disclosure is to solve the problems described above, by proposing an assembly for movement according to predefined rules of motion that is capable of ensuring the correct movement of separate elements according to specific and complex rules of motion.

Within this aim, the disclosure proposes an assembly for movement according to predefined rules of motion that has modest costs.

The present disclosure proposes an assembly for movement according to predefined rules of motion that does not require complex logic systems for the control of distinct motor drive units.

The present disclosure also proposes an assembly for movement according to predefined rules of motion that can operate at high speed.

The present disclosure further proposes an assembly for movement according to predefined rules of motion that ensures high productivity.

The present disclosure also provides an assembly for movement according to predefined rules of motion that has modest costs, is relatively simple to provide in practice and is safe in application.

This aim and these advantages are achieved by providing an assembly for movement according to predefined rules of motion, of the type comprising a supporting frame forming a working path that accommodates a driving element with which at least one movable element is associated which is adapted to move an item to be subjected to a process, characterized in that it comprises, interposed between said driving element and each respective movable element, at least one movement adjustment apparatus which comprises a contoured guide, which is arranged substantially parallel to said driving element, at least one first lever that has a first end that can slide within said guide, and a portion that is pivoted to at least one second lever, which in turn is coupled rigidly to said driving elements, said at least one first lever having a second end, which is opposite the one that can slide in the guide, which is articulated to a linkage, which in turn is pivoted on a portion of a respective movable element.

BRIEF DESCRIPTION OF THE DRAWINGS

Further characteristics and advantages of the disclosure will become better apparent from the description of a preferred but not exclusive embodiment of the assembly for movement according to predefined rules of motion according to the disclosure, illustrated by way of nonlimiting example in the accompanying drawings, wherein:

FIG. 1 is a schematic side view of a portion of an assembly for movement according to predefined rules of motion according to the disclosure;

FIG. 2 is a schematic side view of an enlargement of a movement adjustment apparatus of the assembly of FIG. 1, showing some possible operating configurations;

FIG. 3 is a schematic side view of a part of the apparatus of FIG. 2; and

DETAILED DESCRIPTION OF THE DRAWINGS

Figure 4:
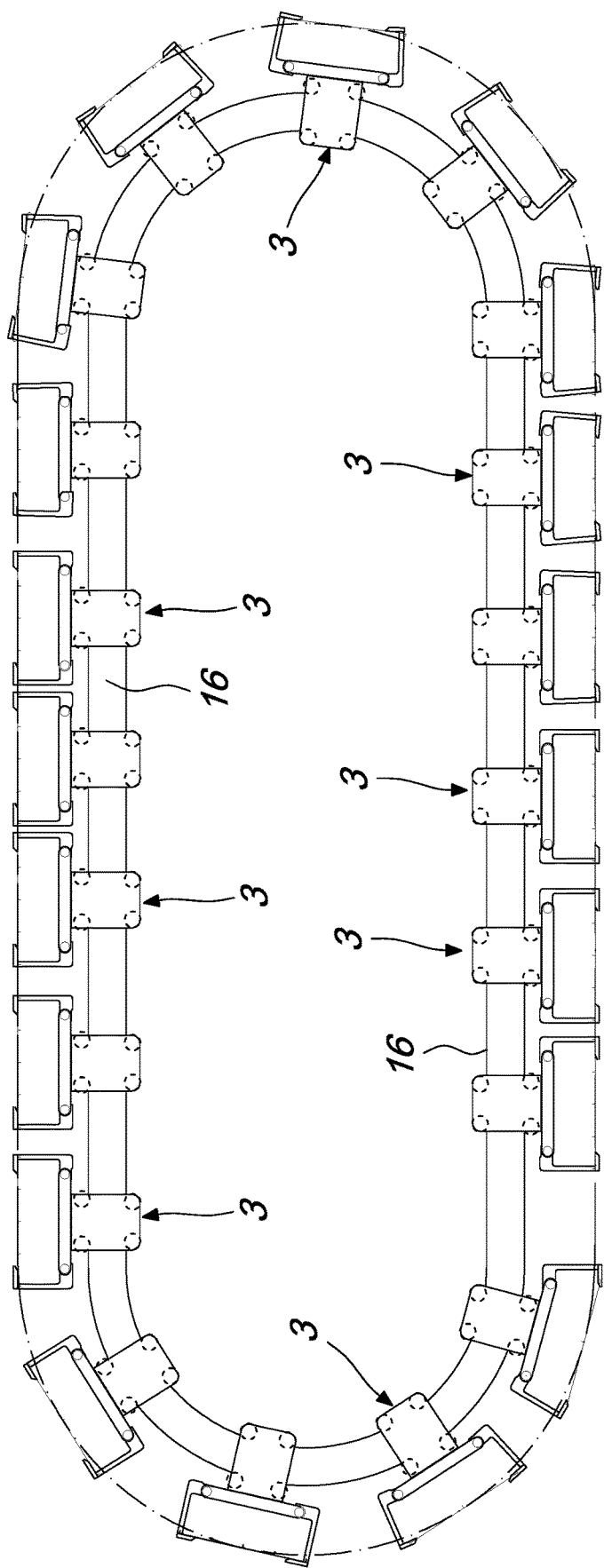
FIG. 4 is a schematic top view of the assembly of FIG. 1.

With particular reference to FIGS. 1-4, the reference numeral 1 designates generally an assembly for movement according to predefined rules of motion.

The movement assembly 1 comprises a supporting frame which forms a working path which accommodates a driving element 2, with which at least one movable element 3 is associated which is adapted to move an item to be subjected to a process.

The item to be subjected to a process can be, depending on the cases and on the possible applications, a package to be formed, a product (or a set of products) to be subjected to packaging or to be subjected to specific processes.

Substantially in interposition between the driving element 2 and each respective movable element 3, the movement assembly 1 comprises at least one movement adjustment apparatus 4.

The apparatus 4 is in turn constituted preferably by a contoured guide 5, which is arranged substantially parallel to the driving element 2, by at least one first lever 6, which has a first end 7 that can slide within the guide 5 and a portion 8 that is pivoted to at least one second lever 9, which in turn is rigidly coupled to the driving elements 2.

The at least one first lever 6 has a second end 10, which is opposite the one that can slide (end 7) in the guide 2, articulated to a linkage 11, which in turn is pivoted to a portion 12 of a respective movable element 3.

The particular apparatus 4 provides separation between the movable element 3 and the driving elements 2; this separation, by utilizing the mutual articulation of the first lever 6, of the second lever 9 and of the linkage 11, allows to obtain a variable motion (according to a specific rule of motion which can comprise positive, negative or nil acceleration values and also stop intervals) of the movable element 3 even if the driving elements 2 move with constant speed, by virtue of the particular shape of the contoured guide 5 that constitutes the compulsory path for the first end 7 of the first lever 6.

In this matter it is possible to obtain stops of one movable element 3 (while the driving elements move at predefined speed) and/or local spacing variations between two contiguous elements 3 (in practice, the two elements 3 can vary their mutual distance, with positive and/or negative accelerations, while the driving elements 2 move at a predefined speed).

With particular reference to a constructive solution of unquestionable interest in practice and in application, the at least one first lever 6 can be validly essentially L-shaped.

It is specified that in this case one end 13 of the at least one second lever 9 is pivoted to the portion 8 of the first lever 6, which is formed at the angular portion that connects the two linear bands of the first lever 6.

According to a particularly efficient embodiment, the at least one second lever 9 comprises a first portion 14 for coupling to the driving element is 2 and at least one second portion 15 for connection to the first lever 6.

The second portion 15 comprises a head (the end 13) for pivoting to the portion 8 of the corresponding first lever 6.

The first portion 14 and the second portion 15 of the second lever 9 can be mutually inclined in order to allow easy pivoting of the end 13 to the portion 8 of the first lever 6.

It is deemed useful to specify, further, that the at least one movable element 3 can slide conveniently on respective tracks 16 which are substantially aligned with the driving element 2 and with the contoured guide 5.

Merely by way of example, it is specified that the tracks 16, the driving element and the contoured guide 5 can be usefully arranged in a loop, forming a configuration of the assembly 1 of the type of a carousel. This shape is particularly widespread and used in all industrial sectors and therefore it is deemed that the assembly 1 according to the disclosure can be used widely with this specific geometric/constructive shape.

In any case, the adoption of other shapes, such as for example linear ones (of which a single active portion will be utilized for production purposes, the passive portion merely having the purpose of returning the elements 3 upstream of the active portion), is not excluded.

For the purposes of optimum operation of the present disclosure, it is specified that the contoured guide 5 may positively comprise an alternation of curved parts 17, parts 18 which are parallel to the driving element 2, parts 19, 20 which are inclined with respect to the driving element 2, and connecting parts interposed between the previously cited ones.

A particular succession of inclined parts 19 and 20 (in particular mutually complementarily inclined) provides for the presence of connecting portions formed between them.

With particular reference to the constructive mode described previously, each movable element 3, upon the passage of the first end 7 of the corresponding first lever 6 in a region of the contoured guide 5 that comprises complementarily inclined parts 19, 20 in sequence, arranged substantially like a sawtooth path 21, can slide with a substantially intermittent motion along the respective tracks 16.

In particular, upon the passage of the first end 7 of the first lever 6 in a region 18 of the contoured guide 5 that is parallel to the driving element 2, the element 3 can slide at a constant speed along the respective tracks 16 and, upon the passage of the first end 7 of the first lever 6 in a region 17, 19, 20 of the contoured guide 5, which is inclined and/or curved with respect to the driving element 2, it accelerates or decelerates along the respective tracks 16.

The motionless condition can be obtained by imparting a negative acceleration which forces a retrograde motion of the movable element 3 with respect to the driving elements 2 with a speed that is equal and opposite with respect to the driving speed of said elements: in this manner, the resultant of the two speeds (which are substantially identical and opposite) entails a motionless interval of the movable element 3 with respect to the track 5.

Furthermore, it is specified that the driving element 2 is preferably chosen from a belt, a chain, a conveyor belt, a cable, a rack and the like.

The portion 14 mates with the driving element by means of a unit 22 for coupling thereto: merely by way of example, the coupling units 22 can be constituted by wheels, rollers or carriages, although the adoption of components of a different type, as a function of the constructive requirements and of the characteristics of the driving elements 2 used, is not excluded.

In order to allow more efficient operation and minimize friction, the first end 7 of the first lever 6 can positively comprise a free end roller, which is accommodated slidingly within the contoured guide 5.

In order to provide greater detail of the constructive aspects of the present disclosure, it is specified that the first L-shaped lever 6 comprises validly a shorter band 23, which ends with the end 7 engaged slidingly in the contoured guide 5, and a longer band 24 which is articulated to the linkage 11 with the end 10.

Finally, it is specified that, with reference to the constructive solution that is given by way of example in the accompanying figures and constitutes a version of particular interest in application, the contoured guide 5 and the tracks 16 can be substantially mutually opposite with respect to the driving element 2.

Advantageously, the present disclosure solves the problems described previously, proposing a movement assembly 1 which is suitable to impart, according to predefined rules of motion, to specific movable elements 3 designed for the movement of a product, an intermediate product or a package (or part thereof), capable of ensuring the correct movement of the distinct elements 3 according to specific and complex rules of motion.

Conveniently, the assembly 1 does not comprise a specific controlled drive unit for each movable element 3 and, for this reason, it entails modest costs in terms of production, installation and management.

Positively, the movement assembly 2 does not require complex logic systems for the control of distinct motor drive units and therefore does not need to be controlled by a control and management processor of the high-performance type (which for this reason is complex and expensive).

Validly, the movement assembly 1 can operate at high speed.

Efficiently, the movement assembly 1 ensures high productivity.

Advantageously, the movement assembly 1 according to the disclosure can be provided in practice in a relatively simple manner, bearing substantially modest costs: these characteristics render the assembly 1 according to the disclosure an innovation of assured application.

The disclosure thus conceived is susceptible of numerous modifications and variations, all of which are within the scope of the appended claims; all the details may further be replaced with other technically equivalent elements.

In the exemplary embodiments shown, individual characteristics, given in relation to specific examples, may actually be interchanged with other is different characteristics that exist in other exemplary embodiments.

In practice, the materials used, as well as the dimensions, may be any according to the requirements and the state of the art.

The disclosures in Italian Patent Application No. 102016000079187 (UA2016A005570) from which this application claims priority are incorporated herein by reference.

The invention claimed is:

1. An assembly for movement according to predefined rules of motion, the assembly comprising a supporting frame forming a working path that accommodates a driving element with which at least one movable element is associated which is adapted to move an item to be subjected to a process, and comprising, interposed between said driving element and each respective movable element, at least one movement adjustment apparatus which comprises a contoured guide, which is arranged substantially parallel to said driving element, at least one first lever that has a first end that can slide within said guide, and a portion that is pivoted to at least one second lever, which in turn is coupled rigidly to said driving elements, said at least one first lever having a second end, which is opposite the one that can slide in the guide, which is articulated to a linkage, which in turn is pivoted on a portion of a respective movable element, wherein said contoured guide comprises an alternation of curved parts, parts which are parallel to said driving element, parts which are inclined with respect to said driving element, and connecting parts which are interposed between the ones mentioned above, wherein the interposition of the at least one movement adjustment apparatus between said driving element and each respective movable element and the mutual articulation of the first lever, the second lever, and the linkage provides for the variable motion of the movable element along the path of the contoured guide.

2. The movement assembly according to claim 1, wherein said at least one first lever is substantially L-shaped, one end of said at least one second lever being pivoted to said first lever at the angular connecting portion between the two linear bands of said at least one first lever.

3. The movement assembly according to claim 2, wherein said first L-shaped lever comprises a shorter band which ends with said first end engaged slidingly within said contoured guide and a longer band which is articulated with the second end to said linkage.

4. The movement assembly according to claim 1, wherein said at least one second lever comprises a first portion for coupling to said driving element and at least one second portion for connection to said first lever, said second portion comprising a head for pivoting to said portion of said at least one first lever.

5. The movement assembly according to claim 1, wherein said at least one movable element preset for the movement of an item to be subjected to a process can slide on respective tracks which are substantially aligned with said driving element and with said contoured guide.

6. The movement assembly according to claim 5, wherein said contoured guide and said tracks are substantially mutually opposite with respect to said driving element.

7. The movement assembly according to claim 1, wherein said movable element, upon the passage of said first end of said at least one first lever in a region of said contoured guide that comprises complementarily inclined parts in sequence, which are arranged substantially in a sawtooth arrangement, slides with a substantially intermittent motion along the respective tracks, upon the passage of said first end of said at least one first lever in a region of said contoured guide that is parallel to said driving element, slides at a constant speed along the respective tracks and, upon the passage of said first end of said at least one first lever in a region of said contoured guide that is inclined and/or curved with respect to said driving element, accelerates or decelerates along the respective tracks.

8. The movement assembly according to claim 1, wherein said driving element is chosen among a belt, a chain, a conveyor belt, a cable, and a rack.

9. The movement assembly according to claim 1, wherein the first end of said first lever comprises a free end roller, which is accommodated within said contoured guide.

* * * * *